US012763457B2

(12) United States Patent
Johnson et al.

(10) Patent No.: US 12,763,457 B2
(45) Date of Patent: Oct. 13, 2026

(54) FLEXIBLE ANTENNA FOR UNMANNED UNDERWATER VEHICLES

(71) Applicant: BAE SYSTEMS Information and Electronic Systems Integration Inc., Nashua, NH (US)

(72) Inventors: Alexander D. Johnson, Wilmington, MA (US); Jean L. Kubwimana, Merrimack, NH (US); Benjamin G. McMahon, Nottingham, NH (US); Ronald Carvalho, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 3 days.

(21) Appl. No.: 18/752,078

(22) Filed: Jun. 24, 2024

(65) Prior Publication Data

US 2025/0392037 A1 Dec. 25, 2025

(51) Int. Cl.

*H01Q 1/34* (2006.01)
*H01Q 1/08* (2006.01)
*H01Q 1/38* (2006.01)
*H01Q 1/48* (2006.01)

(52) U.S. Cl.

CPC ................ *H01Q 1/34* (2013.01); *H01Q 1/08* (2013.01); *H01Q 1/38* (2013.01); *H01Q 1/48* (2013.01)

(58) Field of Classification Search

CPC .. H01Q 1/34; H01Q 1/08; H01Q 1/38; H01Q 1/48

See application file for complete search history.

(56) References Cited

U.S. PATENT DOCUMENTS

| | | | |
|---|---|---|---|
| 5,646,366 | A | 7/1997 | O'Connell |
| 5,749,312 | A | 5/1998 | Hillenbrand et al. |
| 5,977,918 | A | 11/1999 | Sirmalis |
| 6,058,874 | A | 5/2000 | Glenning et al. |
| 8,104,420 | B2 | 1/2012 | Wiggins et al. |
| 8,418,642 | B2 | 4/2013 | Vosburgh |
| 8,552,282 | B1 | 10/2013 | Garcia et al. |
| 8,813,669 | B2 | 8/2014 | Race et al. |
| 10,683,069 | B2 | 6/2020 | Ichihara |
| 10,773,780 | B2 | 9/2020 | Smith et al. |
| 11,001,356 | B1 | 5/2021 | Van Valkenburgh et al. |
| 11,136,100 | B2 | 10/2021 | Nation et al. |
| 11,522,265 | B2 | 12/2022 | Rossman et al. |

(Continued)

FOREIGN PATENT DOCUMENTS

| | | | |
|---|---|---|---|
| WO | 2015127482 | A2 | 8/2015 |
| WO | 2016179600 | A1 | 11/2016 |

*Primary Examiner* — Dimary S Lopez Cruz
*Assistant Examiner* — Austin M Back
(74) *Attorney, Agent, or Firm* — Gary McFaline

(57) ABSTRACT

An antenna assembly includes a flexible substrate configured to be extended from a retracted configuration to a deployed configuration and retracted from the deployed configuration to the retracted configuration. The antenna assembly further includes a ground plane element disposed on the substrate and a plurality of antenna elements disposed on the substrate. In the deployed configuration, the antenna assembly extends vertically away from a hull of an underwater vehicle. In the retracted configuration, the antenna assembly is retracted into the hull and/or conforms to a shape of the hull. The substrate can be attached to the underwater vehicle.

16 Claims, 11 Drawing Sheets

(56) References Cited

U.S. PATENT DOCUMENTS

| | | | | |
|---|---|---|---|---|
| 11,600,910 | B1 | 3/2023 | Johnson et al. | |
| 11,682,822 | B1 | 6/2023 | Johnson et al. | |
| 2013/0068153 | A1 | 3/2013 | Hine | |
| 2015/0375840 | A1 | 12/2015 | Stowers | |
| 2016/0226126 | A1* | 8/2016 | Daton-Lovett .......... | H01Q 1/36 |
| 2022/0215657 | A1 | 7/2022 | Hiller | |
| 2022/0344793 | A1* | 10/2022 | Rossman ................. | H01Q 1/34 |

* cited by examiner

FRONT SIDE VIEW

FLEXIBLE ANTENNA FOR UNMANNED UNDERWATER VEHICLES

FIELD OF DISCLOSURE

The present disclosure relates to antennas, and more particularly, to a flexible antenna for an unmanned underwater vehicle.

BACKGROUND

An unmanned underwater vehicle (UUV) is a submersible vehicle that can be operated remotely or autonomously. UUVs are used in many marine applications including scientific exploration, ship hull inspection, and military missions. A UUV may use an inertial measurement unit (IMU) and various sensors to navigate while submerged. However, radio navigation aids, including satellite-based navigation (e.g., a global navigation satellite system or GNSS), are not usable underwater. While dead reckoning sensors may provide sole-source navigation for short duration missions, accumulation of navigation error eventually requires external measurements to maintain or restore accurate performance. Furthermore, a UUV mission may utilize radio direction finding capabilities. Therefore, UUVs regularly surface to receive GNSS signals and other radio frequency (RF) transmissions for obtaining an accurate position fix and for direction finding. Such signals are received by an antenna extending above the sea surface. However, including an antenna on a UUV can present complications such as increasing drag resistance or requiring a portion of the vehicle to rise above the surface during covert operations. Therefore, non-trivial issues remain regarding UUV navigation and direction finding.

Although the following detailed description refers to illustrative examples, many alternatives, modifications, and variations thereof will be apparent in light of this disclosure.

DETAILED DESCRIPTION

An antenna assembly for an underwater vehicle is disclosed herein. In an example, the antenna assembly includes a flexible substrate configured to be extended from a retracted configuration to a deployed configuration and retracted from the deployed configuration to the retracted configuration. The antenna assembly further includes a ground plane element disposed on the substrate and a plurality of antenna elements disposed on the substrate. In the deployed configuration, the antenna assembly extends vertically or otherwise away from a hull of an underwater vehicle. In the retracted configuration, the antenna assembly is retracted into the hull and/or conforms to a shape of the hull. The substrate can be attached to the underwater vehicle.

Overview

In addition to navigation, direction finding is a key capability for UUV missions. To achieve this, the UUV uses a combination of techniques including obtaining position fixes from navigation aids and determining the line of sight of radio signals for locating the sources of such signals. For example, the UUV can detect, identify, locate, and report on signals of interest in a marine environment using an aperture antenna deployed above the sea surface. However, aperture antennas can be a hindrance to the mission due to several competing factors that can lead to undesirable constraints. One factor is that the antenna must be located high above the water line (e.g., greater than six inches) to function effectively. However, an antenna extending from the hull of the UUV increases drag on the UUV, leading to reduced power efficiency. A solution that balances these factors is an antenna that can be deployed from the UUV as needed during radio operations and retracted from the deployed position when not in use to reduce drag.

To this end, an example of the present disclosure provides a flexible antenna that can be stowed either within the hull of an underwater vehicle or conformal to the hull of the underwater vehicle as a low drag feature, and deployed for wideband signal collation and direction finding while the underwater vehicle is at or near the sea surface. In some examples, the underwater vehicle has a 12-inch diameter hull around which the flexible antenna can be wrapped while in the stowed position. Numerous embodiments, variations, and applications will be appreciated in light of this disclosure.

Maritime Environment with Underwater Vehicle

Figure 1:
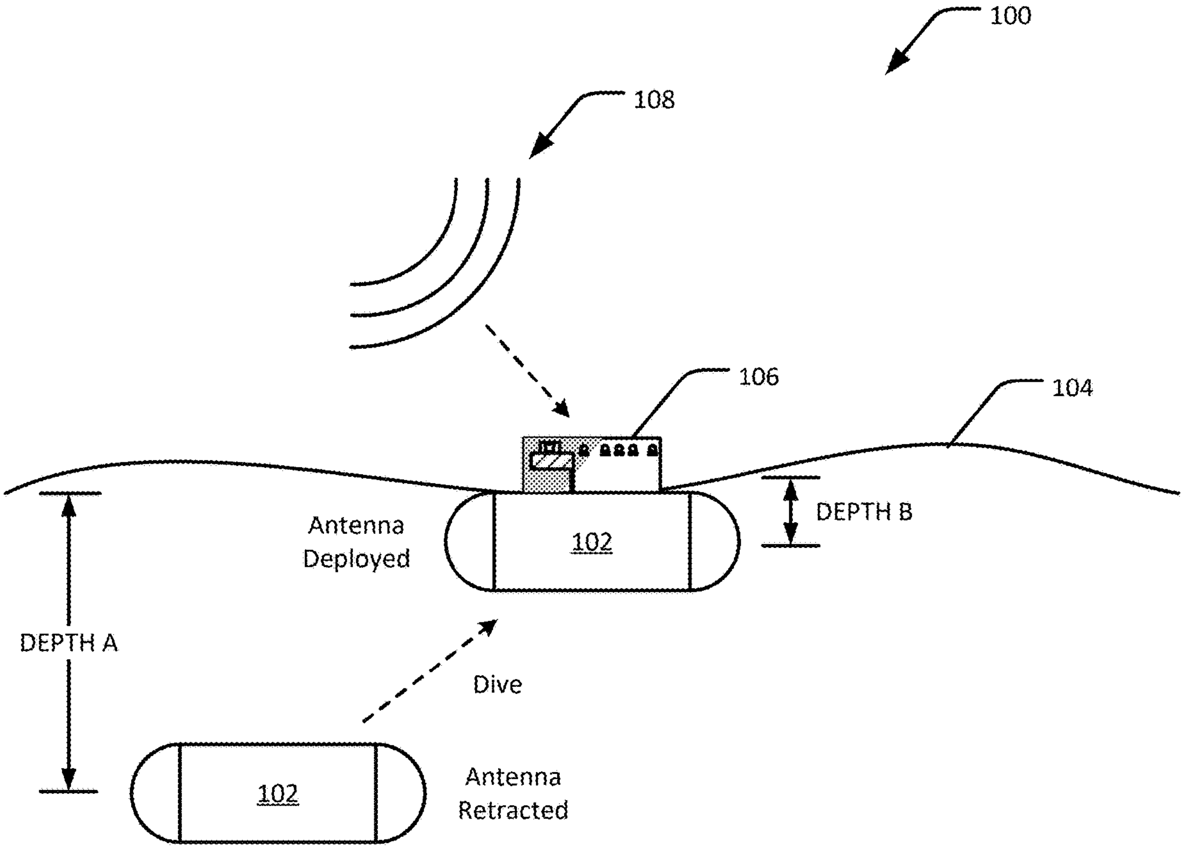
FIG. 1 depicts an example maritime environment in which an underwater vehicle moves beneath a water surface, in accordance with an example of the present disclosure.

FIG. 1 shows an example maritime environment 100 in which an underwater vehicle 102 moves beneath a water surface 104, such as a surface of an ocean or lake. The underwater vehicle 102 is a submersible vehicle, such as a manned or unmanned underwater vehicle (e.g., a UUV). In some examples, the underwater vehicle 102 has a diameter of at least four inches. The underwater vehicle 102 can be self-propelled (e.g., a UUV) or propulsion can be provided at least partially by another vessel (e.g., a towed unmanned submersible). The underwater vehicle 102 can dive to various depths below the water surface 104, such as shown in FIG. 1 at depth A and depth B, which is at or near the water surface 104.

At any depth, but more particularly at or near the water surface 104 (e.g., depth B), the underwater vehicle 102 can deploy a flexible antenna assembly 106. In a deployed position, at least a portion of the antenna assembly 106 can extend above the water surface 104 (like a dorsal fin) while at least a portion of the underwater vehicle 102 remains submerged below the water surface 104. In a stowed position, the antenna assembly 106 is withdrawn into the underwater vehicle 102 or into a conformal shape around a hull of the underwater vehicle 102. In some examples, the antenna assembly 106 is a monopole omnidirectional direction finding antenna configured to operate over a wide frequency range of 1-20 GHz. In some other examples, the antenna assembly 106 is configured to operate at lower frequencies (e.g., approximately 200 MHz) or in a narrow band of frequencies, such as for receiving midband satellite communication signals including GPS and Satcom. It will be appreciated that the antenna assembly 106 can be configured in any number of ways to accommodate the frequencies of interest and provide direction finding in azimuth, elevation, or both.

In some examples, the underwater vehicle 102 includes one or more electronic devices coupled to the antenna assembly 106, such as RF and/or optical receivers, transmitters, or transceivers for sending/receiving wireless communication signals 108 with, for example, a ship, aircraft, satellite, or a land-based communication station. Data received by underwater vehicle 102 may include, for example, Global Positioning System (GPS) signals for fixing the location of the underwater vehicle 102, messages or other communications, or signals for fixing the location of a source of such signals in relation to the underwater vehicle 102.

Antenna Layout

Figure 2A:
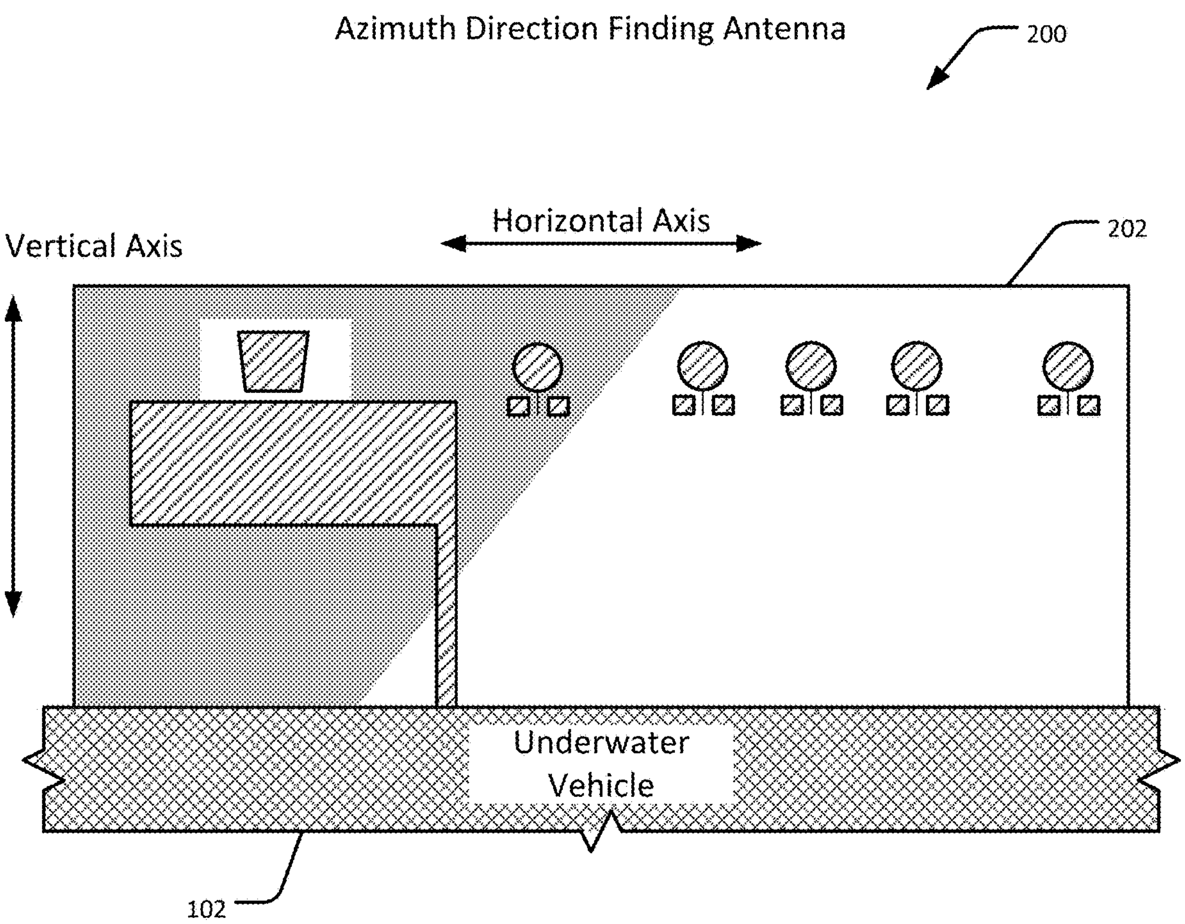
FIGS. 2A, 2B, and 2C show an azimuth direction finding antenna for the underwater vehicle of FIG. 1, in accordance with an example of the present disclosure.
Figure 2B:
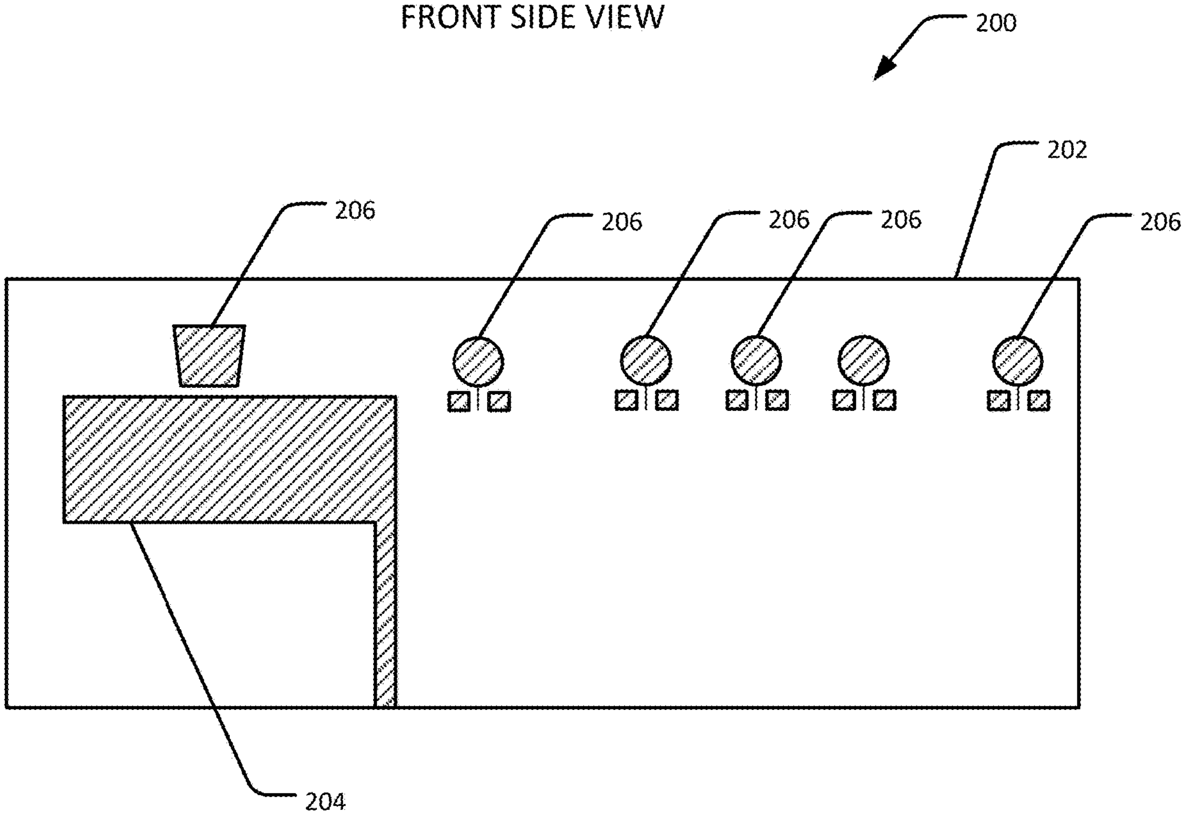
Figure 2C:
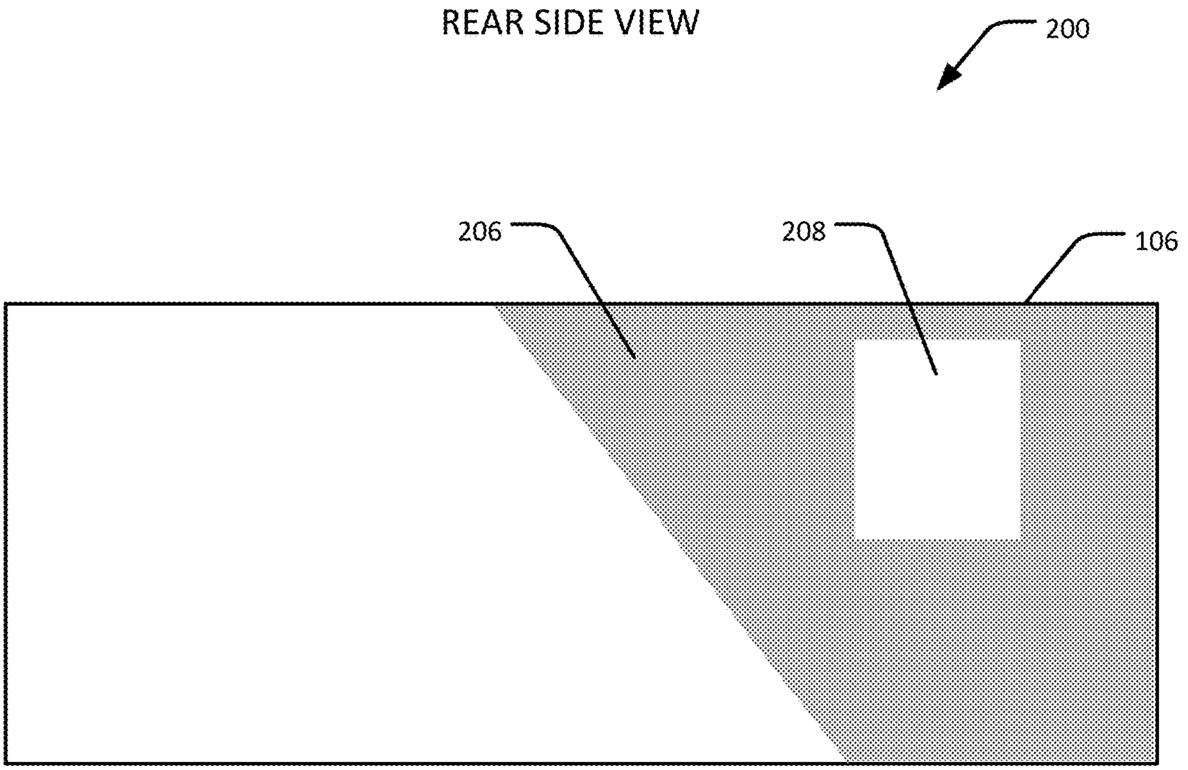

FIGS. 2A, 2B, and 2C show an azimuth direction finding antenna 200 in accordance with an example of the present disclosure. The antenna assembly 106 of FIG. 1 can include the antenna 200. The antenna 200 can be attached or coupled to the underwater vehicle 102, such as shown in FIG. 2A.

The antenna 200 includes a flexible substrate 202 that can be extended from a retracted (e.g., folded, rolled, or arcuate) configuration into a deployed (e.g., planar) configuration as shown, and likewise retracted from the deployed configuration into the retracted configuration. In the planar configuration, the substrate 202 is flat or substantially planar and not arcuate. In some examples, the substrate 202 is a dielectric polyimide or other flexible, stable, and durable non-conductive material that is less than or equal to 20 thousands of an inch (e.g., 5, 10, or 20 mils) thick and generally rectangular in shape while in the planar configuration (e.g., 10 inches high by 20 inches wide or other size where the width of the antenna 200 along the horizontal axis is approximately twice the height of the antenna assembly 106). In general, the wider the antenna 200, the greater the directional precision of the antenna assembly 106. In some examples, the height of the substrate 202 is greater than or equal to 6 inches. In some examples, the height of the substrate 202 is at least one-quarter of the wavelength of a frequency of interest to be received by the antenna assembly 106. Upon one or both sides of the substrate 202 are one or more layers of a metallization material (e.g., copper) that are approximately 0.6 mils thick, and one or more apertures where the substrate is not covered by any metallization material.

In some examples, the antenna 200, or more specifically, the flexible substrate, can include a bi-stable composite material such as disclosed in U.S. Pat. No. 11,001,356, the contents of which are incorporated by reference herein. For example, the bi-stable composite material includes a fiberglass composite that holds its shape in two different states depending on how it is bent. In a first state, the antenna 200 rolls onto itself like a roll of tape and may be wound around a spool or other similar structure. Once one end of the antenna 200 is pulled away from the remainder of the roll, the bi-stable composite material exhibits a second state where it forms a rigid, elongated, and planar shape. The antenna 200 can extend away from the underwater vehicle 102 while maintaining its shape and rigidity. To retract the antenna 200, the bi-stable composite material is pulled back and rolled onto a spool or other similar structure where it naturally transitions from its second state back to its first state. In some examples, the antenna 200 can be woven into the bi-stable material or attached to an outer surface of the bi-stable material.

In some examples, the antenna 200 can be deployed from and/or retracted into the underwater vehicle 102 using pneumatic actuators, hydraulic actuators, and/or mechanical means such as a spring.

FIG. 2B is a front view of the antenna 200 and FIG. 2C is a rear view of the antenna 200, in accordance with an example of the present disclosure. The antenna 200 includes a ground plane element 204, a plurality of antenna elements 206 disposed on or otherwise applied to the substrate 202, and an aperture 208 at least partially surrounded by at least one of the antenna elements 206, such as shown. The ground plane element 204 and the antenna elements 206 can include a metallization or other conductive material, such as copper. The aperture 208 is a region without (not including) the ground plane element 204 and the antenna elements 206.

The shapes and locations of the ground plane element 204, the antenna elements 206, and the aperture 208 on the substrate 202 can be varied to achieve the desired frequency range(s) and direction finding range(s) (e.g., azimuth and/or elevation). For example, at least one of the antenna elements can be a trapezoid, a bow tie, and/or a lollipop type element. In this example, at least some of the antenna elements 206 are arranged along the horizontal axis on one side of the substrate 202 (e.g., the front side of the antenna 200) to provide azimuth direction finding capability from one side (e.g., the front side of the antenna 200). In some examples, at least some of the antenna elements 206 are on the opposite side of the substrate 202 (e.g., the rear side of the antenna 200) to provide azimuth direction finding capability from the opposite side (e.g., the rear side of the antenna 200). The example shown in FIG. 2B is a narrowband monopole omnidirectional antenna and the example shown in FIG. 2C is a low frequency monopole omnidirectional antenna (e.g., about 200 MHz).

The resolution of the direction finding capability of the antenna 200 is a function of the number, shape(s), and location(s) of the antenna elements 206 and the aperture 208 as well as the size and shape of the antenna 200. For example, adding additional antenna elements 206 arranged along the horizontal axis of the substrate 202 increases the azimuth direction finding resolution.

Figure 3A:
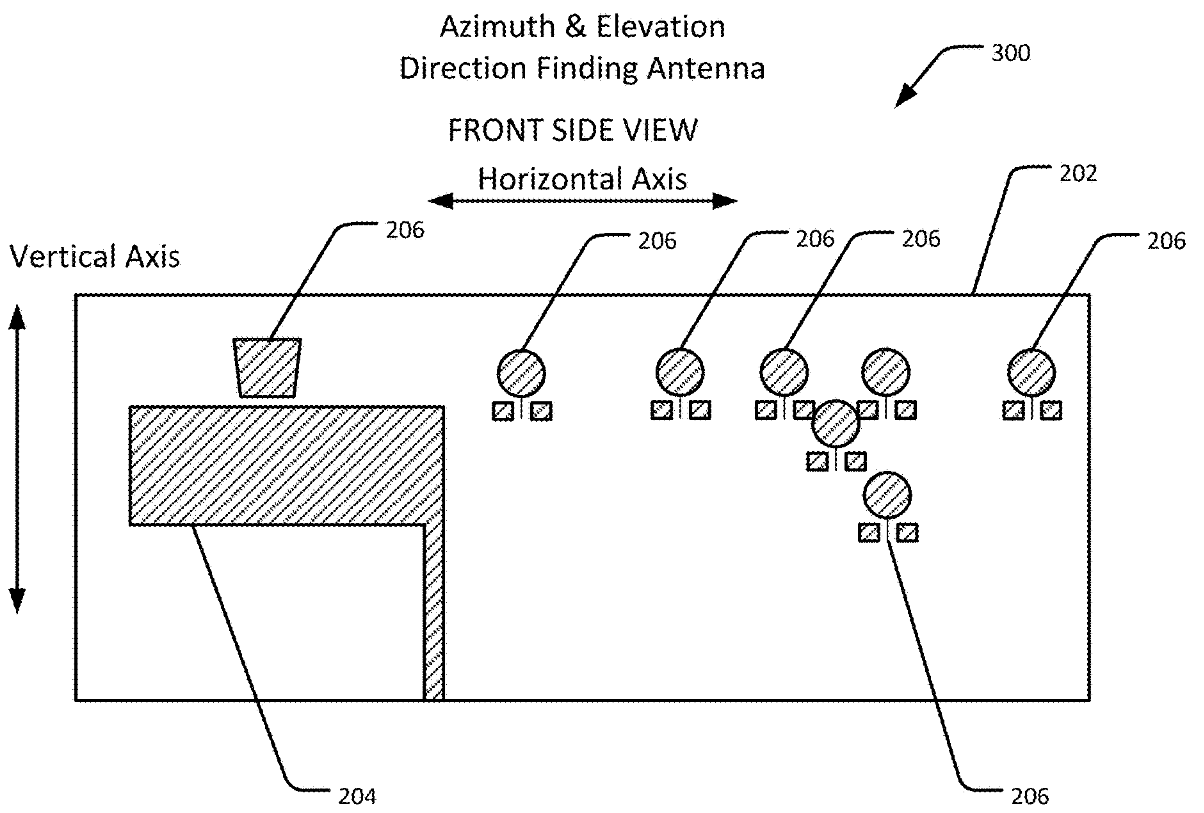
FIGS. 3A and 3B show an azimuth and elevation direction finding antenna for the underwater vehicle of FIG. 1, in accordance with another example of the present disclosure.
Figure 3B:
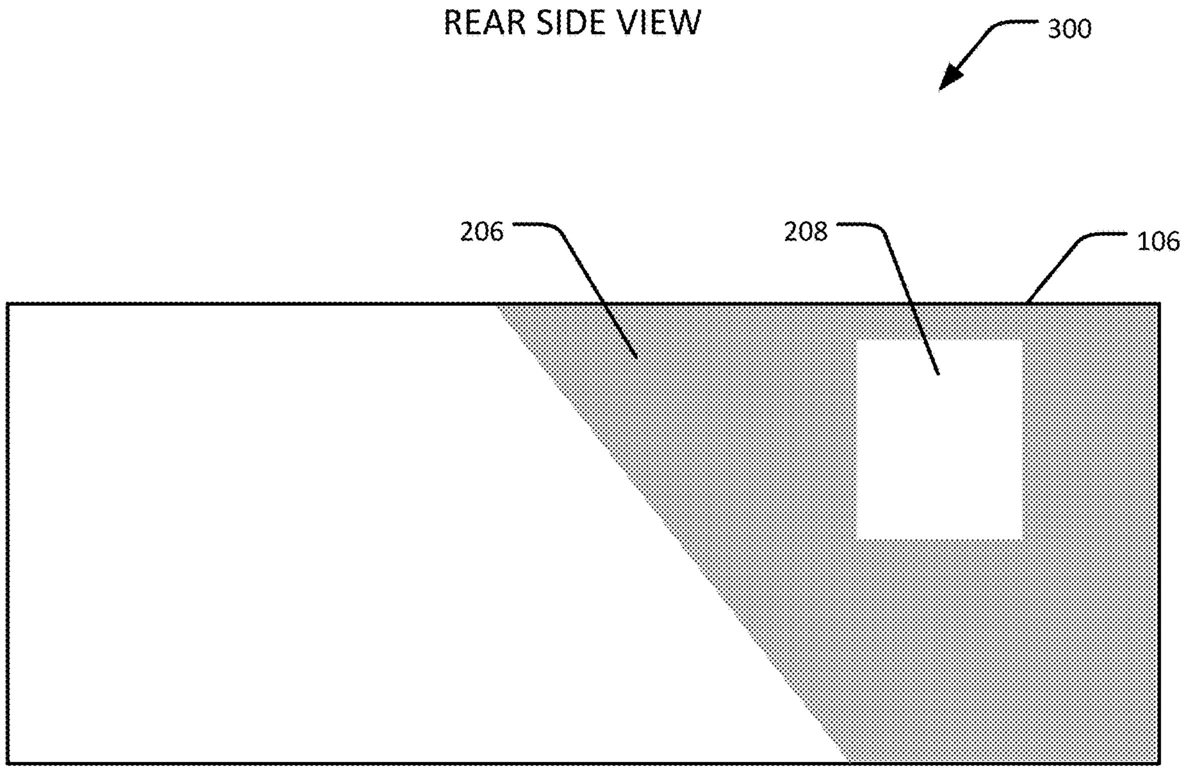

FIGS. 3A and 3B show front and rear views, respectively, of an azimuth and elevation direction finding antenna 300, in accordance with another example of the present disclosure. The antenna assembly 106 of FIG. 1 can include the antenna 300. The antenna 300 can be attached or coupled to the underwater vehicle 102, such as described with respect to FIG. 2A.

The antenna 300 includes the flexible substrate 202, the ground plane element 204, the plurality of antenna elements 206 disposed on the substrate 202, and the aperture 208, such as shown and described with respect to FIGS. 2A-C. In this example, at least some of the antenna elements 206 are arranged along both the horizontal axis and the vertical axis, such as shown in FIG. 3A. The elements 206 that are along the horizontal axis provide azimuth direction finding capability and the elements 206 that are along the vertical axis provide elevation direction finding capability.

Underwater Vehicle Control System

Figure 4:
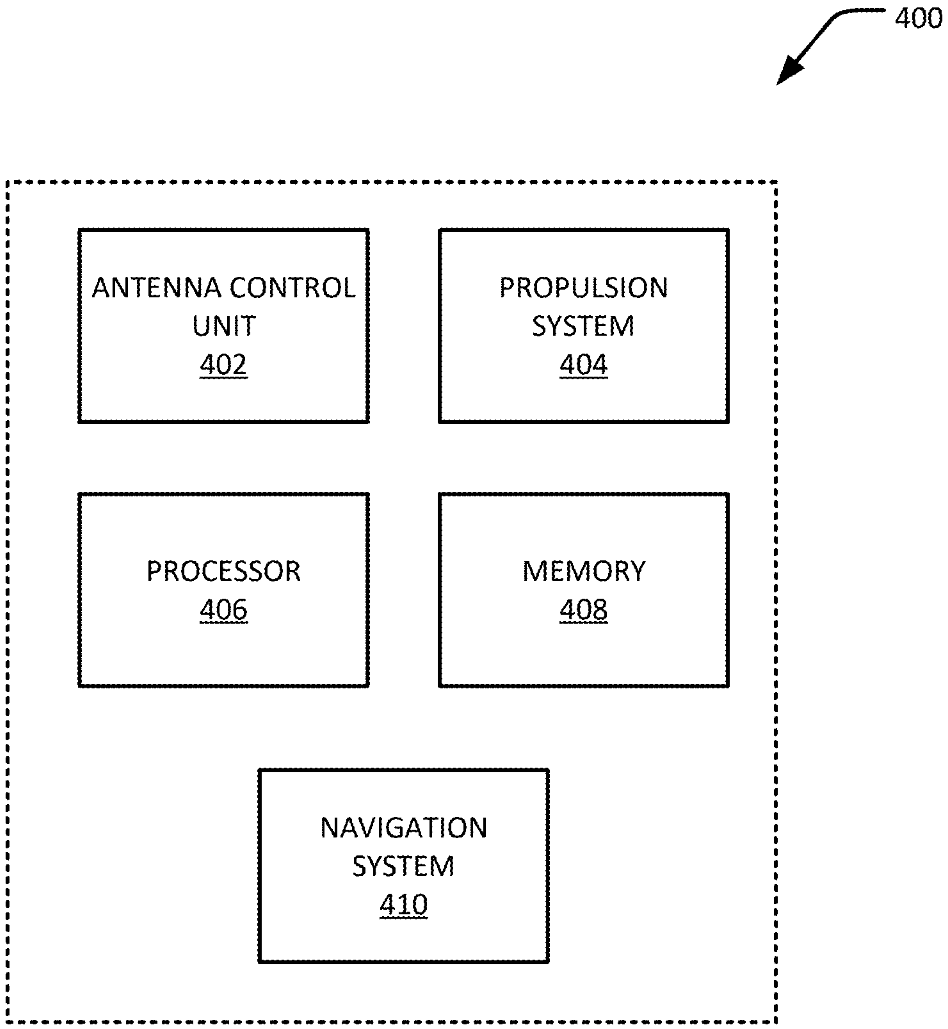
FIG. 4 is a block diagram of a control system for the underwater vehicle of FIG. 1, in accordance with an example of the present disclosure.

FIG. 4 is a block diagram of a control system 400 for the underwater vehicle 102, in accordance with an example of the present disclosure. The control system 400 includes an antenna control unit 402, a propulsion system 404, a processor 406, a memory 408, and a navigation system 410.

The antenna control unit 402 includes electronic circuits configured to cause deployment and retraction of the antenna assembly 106 from and to the underwater vehicle 102. In some embodiments, antenna control unit 402 operates in conjunction with the processor 406 and the memory 408 for controlling deployment and retraction of the antenna assembly 106, including any pneumatic, hydraulic, or mechanical components. In some examples, the antenna control unit 402 controls the operation of the antenna assembly 106, such as a receiver, a transmitter, and/or signal processor for receiving, transmitting, and/or processing radio signals received by the antenna assembly 106.

The propulsion system 404 includes components for moving the underwater vehicle 102 in the water. For example, the propulsion system 404 can include a motor, a fuel or power source, and one or more propellers, thrusters, and/or control surfaces. In an example, the motor can turn the propeller in the water to move underwater vehicle 102. In another examples, the motor can activate a pump that forces water out of the thruster to move underwater vehicle 102. In yet another example, the propulsion system 404 can change the pitch of one or more control surfaces to change the direction of motion of the underwater vehicle 102. In another example, the propulsion system 404 is a passive, buoyancy-based mechanism such as used in some types of underwater gliders.

The processor 406 can be any suitable processor, and can include other components to assist in the execution of mission software and/or any control and processing operations associated with the underwater vehicle 102. In some examples, the processor 406 is implemented as one or more processor cores. The processor core or cores can include any type of processor, such as, for example, a micro-processor, an embedded processor, a digital signal processor (DSP), a graphics processor (GPU), a network processor, a field programmable gate array (FPGA), or other computing or electronic device. The processor 406 can have multithreaded cores such that the processor 406 includes more than one hardware thread context or logical processor per core. In some examples, the processor 406 can be implemented as a complex instruction set computer (CISC) or a reduced instruction set computer (RISC) processor. In some examples, the processor 406 can be configured to execute an Operating System (OS) 1024, which can, for example, include any suitable operating system, such as Google Android (Google Inc., Mountain View, CA), Microsoft Windows (Microsoft Corp., Redmond, WA), macOS (Apple Inc., Cupertino, CA), Linux, or a real-time operating system (RTOS). In some examples, the processor 406 is a special purpose device configured to perform one or more of the functions variously described herein.

The memory 408 can be implemented using any suitable type of digital storage including, for example, a random-access memory (RAM). A random-access memory is any memory having storage locations, or cells, which can be read from and written to in any order. For example, the memory 408 can be implemented as a volatile memory device such as a RAM, dynamic RAM (DRAM), or static RAM (SRAM) device, or implemented as a non-volatile storage device such as a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

The navigation system 410 determines the position of the underwater vehicle 102 using sensors and/or data received via the antenna assembly 106 (e.g., GPS coordinates).

More generally, the control system 400 is configured to be hosted on, or otherwise be incorporated into, systems of the underwater vehicle 102, including data communications systems, radar systems, computing systems, or embedded systems of any kind. The disclosed techniques can also be used to improve the reliability of signal acquisition in marine applications such as underwater vehicle operations. Other componentry and functionality not reflected in FIG. 4 will be apparent in light of this disclosure, and it will be appreciated that other examples are not limited to any particular hardware configuration.

It will be appreciated that in some examples, the various components of the control system 400 can be combined or integrated in a system-on-a-chip (SoC) architecture. In some examples, the components can be hardware components, firmware components, software components or any suitable combination of hardware, firmware, or software.

Underwater Vehicle

Figure 5:
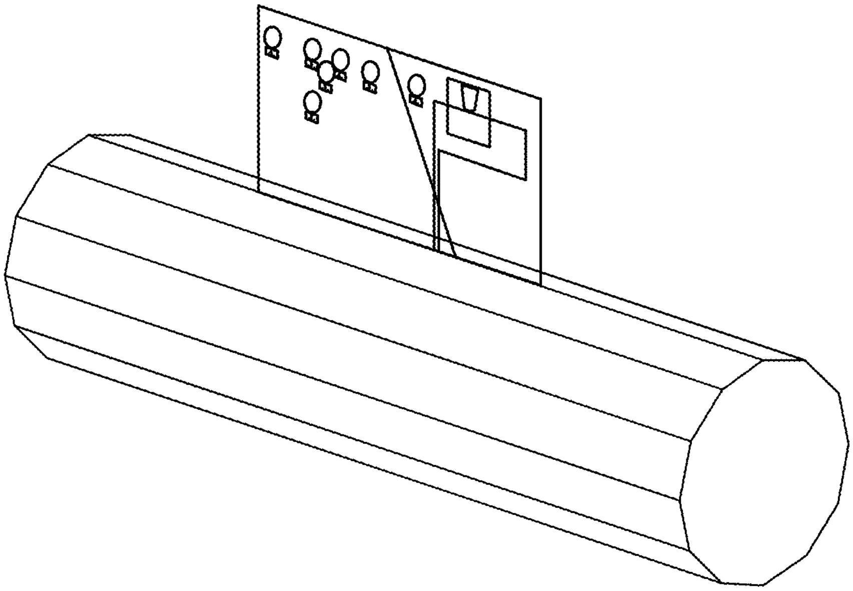
FIG. 5 is a perspective view of the underwater vehicle of FIG. 1 with the antenna assembly in a deployed configuration, in accordance with an example of the present disclosure.

FIG. 5 is a perspective view of the underwater vehicle 102 of FIG. 1 with the antenna assembly 106 in a deployed configuration, in accordance with an example of the present disclosure. As shown, the antenna assembly 106 can be extended upwards and away from a hull 502 of the underwater vehicle 102.

Figure 6A:
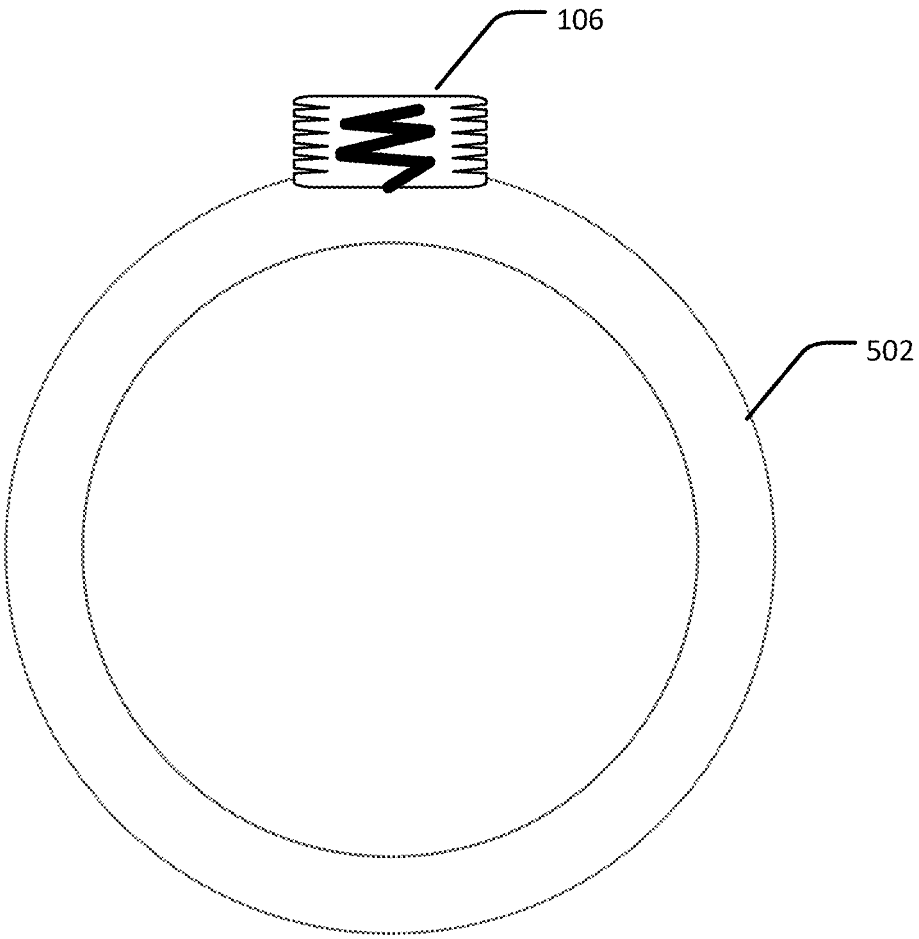
FIG. 6A is a cross-sectional side view of the underwater vehicle of FIG. 1 with the antenna assembly in a retracted configuration, in accordance with an example of the present disclosure.

FIG. 6A is a cross-sectional side view of the underwater vehicle 102 of FIG. 1 with the antenna assembly 106 in a retracted configuration, in accordance with an example of the present disclosure. For example, in the retracted configuration, the antenna assembly 106 can be collapsed or folded against the hull 502.

Figure 6B:
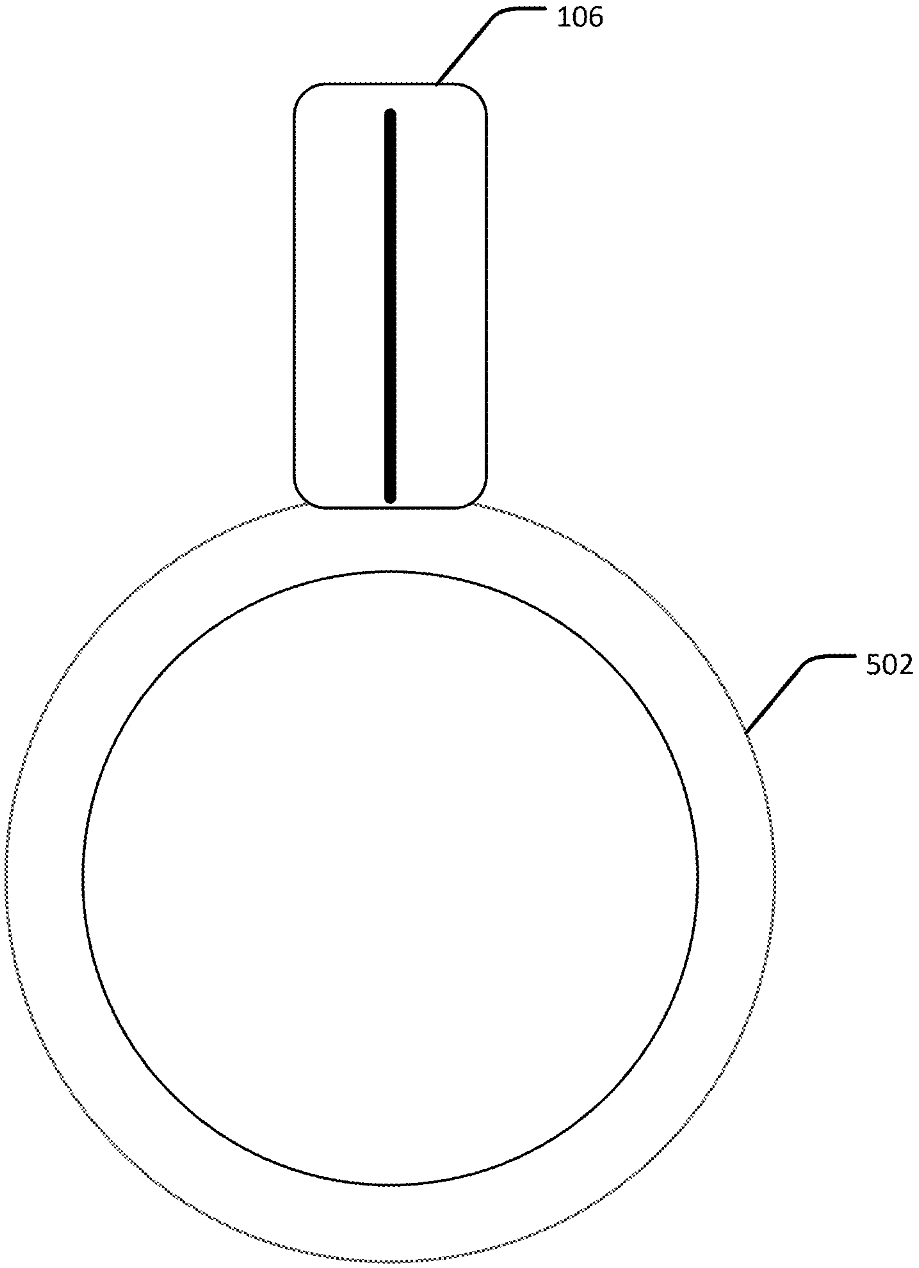
FIG. 6B is a cross-sectional side view of the underwater vehicle of FIG. 1 with the antenna assembly in a deployed configuration, in accordance with an example of the present disclosure.

FIG. 6B is a cross-sectional side view of the underwater vehicle 102 of FIG. 1 with the antenna assembly 106 in a deployed configuration, in accordance with an example of the present disclosure. For example, in the deployed configuration, the antenna assembly 106 can extend vertically away from the hull 502.

Figure 7:
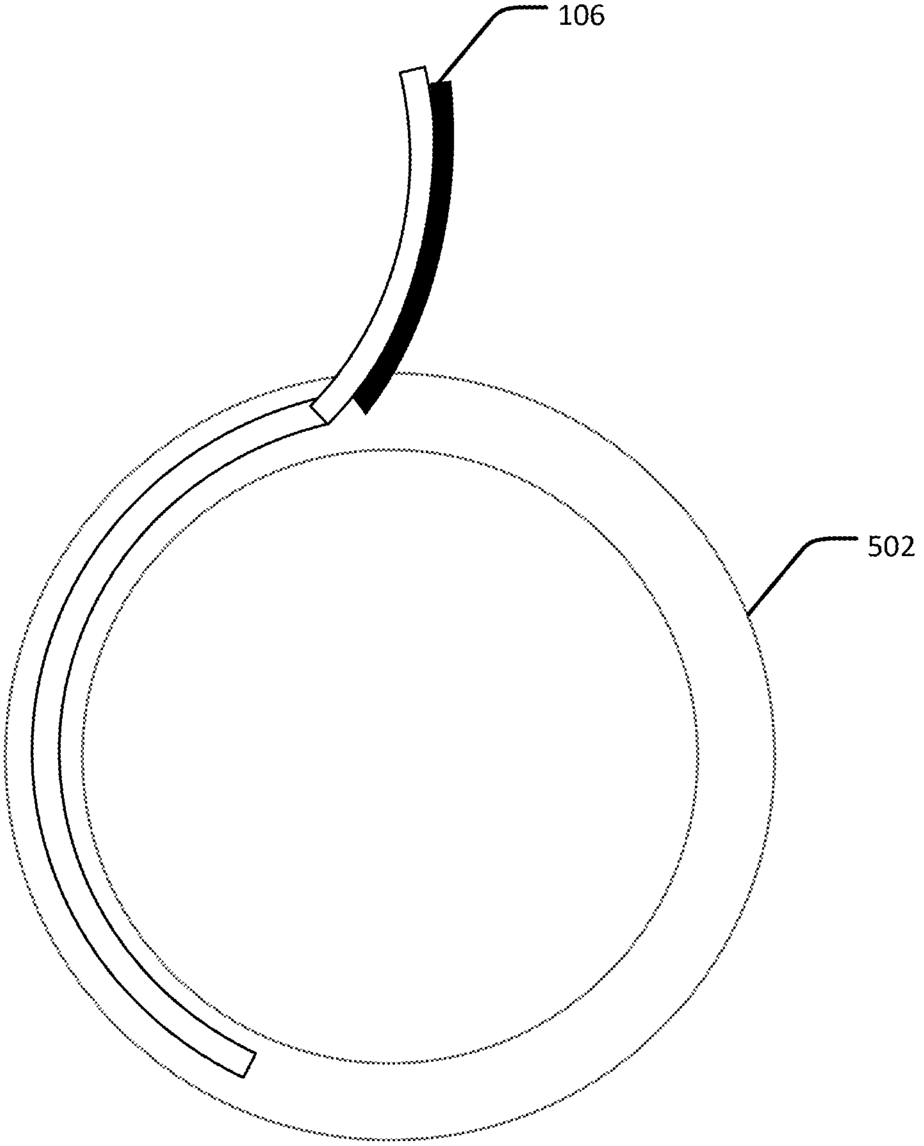
FIG. 7 is a cross-sectional side view of the underwater vehicle of FIG. 1 with the antenna assembly in a partially deployed configuration, in accordance with an example of the present disclosure.

FIG. 7 is a cross-sectional side view of the underwater vehicle 102 of FIG. 1 with the antenna assembly 106 in a partially deployed configuration, in accordance with an example of the present disclosure. For example, the antenna assembly 106 can be retracted into and extended from within the hull 502. In the retracted configuration, the shape of the antenna assembly 106 is retracted into the hull 502 and/or conforms to the shape of the hull 502 (e.g., the antenna assembly 106 wraps around at least a portion of the hull 502). In the deployed configuration, the antenna assembly 106 extends vertically away from the hull 502, somewhat like a dorsal fin, so as to extend above the water surface. Other examples may be configured to deploy the antenna assembly 106 in a non-vertical manner, such as at an angle (e.g., 15 to 45 degrees from vertical). More generally, the use of the term vertical in this context is not intended to implicate a perfect vertical orientation at 90 degrees or otherwise straight up.

Various examples of the present disclosure can be implemented using hardware elements, software elements, or a combination of both. Examples of hardware elements can include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software can include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements can vary in accordance with any number of factors, such as desired computational rate, power level, heat tolerances, processing cycle budget, input data rates, output data rates, memory resources, data bus speeds, and other design or performance constraints.

Some embodiments can be described using the expression "coupled" and "connected" along with their derivatives. These terms are not intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

Some examples disclosed herein can be implemented in various forms of hardware, software, firmware, and/or special purpose processors. For example, in one example, at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one example, the system can be hosted on a given website and implemented, for example, using JavaScript or another suitable browser-based technology. For instance, in some examples, the platform 1000 can leverage processing resources provided by a remote computer system accessible via the network 1022. The computer software applications disclosed herein can include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other examples are not limited to any particular hardware or software configuration. Thus, in some examples, the platform 1000 can include additional, fewer, or alternative subcomponents as those described above.

The non-transitory computer readable medium can include any suitable medium for storing digital information, such as a hard drive, a server, a flash memory, and/or random-access memory (RAM), or a combination of memories. In some examples, the components and/or modules disclosed herein can be implemented with hardware, including gate level logic such as a field-programmable gate array (FPGA), or alternatively, a purpose-built semiconductor such as an application-specific integrated circuit (ASIC). Still other examples can be implemented with a microcontroller having a number of input/output ports for receiving and outputting data, and a number of embedded routines for carrying out the various functionalities disclosed herein. It will be apparent that any suitable combination of hardware, software, and firmware can be used, and that other examples are not limited to any particular system architecture.

Some examples can be implemented, for example, using a machine readable medium or article that stores a set of instructions that, when executed by a machine, causes the machine to perform a method, process, and/or operations in accordance with the examples described herein. Such a machine can include, for example, any suitable processing platform, computing platform, computing device, processing device, computing system, processing system, computer, process, or the like, and can be implemented using any suitable combination of hardware and/or software. The machine readable medium or article can include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions can include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it will be appreciated that terms such as "processing," "computing," "calculating," and "determining" refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system.

The terms "circuit" or "circuitry" can include, for example, hardwired circuitry, programmable circuitry, such as computer processors comprising one or more individual instruction processing cores, state machine circuitry, and/or firmware that stores instructions executed by programmable circuitry. The circuitry can include a processor and/or controller configured to execute one or more instructions to perform one or more operations described herein. The instructions can be implemented as, for example, an application, software, firmware, etc., configured to cause the circuit or circuitry to perform any of the operations or functions described herein. Software can be implemented as a software package, code, instructions, instruction sets and/or data recorded on a computer-readable storage device. Software can be implemented to include any number of processes, and processes, in turn, can be implemented to include any number of threads, etc., in a hierarchical fashion. Firmware can be implemented as code, instructions or instruction sets and/or data that are hard-coded (e.g., non-volatile) in memory devices. The circuit or circuitry can be implemented as part of a larger system, for example, an integrated circuit (IC), an application-specific integrated circuit (ASIC), a system-on-a-chip (SoC), desktop computers, laptop computers, tablet computers, servers, smartphones, etc. Other examples can be implemented as software executed by a programmable control device. In such cases, the terms "circuit" or "circuitry" are intended to include a combination of software and hardware such as a programmable control device or a processor capable of executing the software. As described herein, various examples can be implemented using hardware elements, software elements, or any combination thereof. Examples of hardware elements can include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, and/or chip sets.

FURTHER EXAMPLE EXAMPLES

The following examples pertain to further examples, from which numerous permutations and configurations will be apparent.

Example 1 provides an antenna assembly comprising a flexible substrate configured to be extended from a retracted configuration to a deployed configuration, and retracted from the deployed configuration to the retracted configuration; a ground plane element disposed on the substrate; and a plurality of antenna elements disposed on the substrate; wherein, in the deployed configuration, the antenna assembly extends away from a hull of an underwater vehicle, and wherein, in the retracted configuration, the antenna assembly is retracted into the hull and/or conforms to a shape of the hull.

Example 2 includes the subject matter of Example 1, wherein the substrate is attached to the underwater vehicle.

Example 3 includes the subject matter of any one of Examples 1 and 2, wherein the ground plane and the antenna elements comprise one or more layers of a metallization material.

Example 4 includes the subject matter of any one of Examples 1-3, wherein the antenna elements are arranged along a horizontal axis on one side of the substrate.

Example 5 includes the subject matter of any one of Examples 1-4, wherein the antenna elements are arranged along a vertical axis on one side of the substate.

Example 6 includes the subject matter of any one of Examples 1-5, comprising an aperture at least partially surrounded by at least one of the antenna elements.

Example 7 includes the subject matter of any one of Examples 1-6, wherein the antenna elements comprise trapezoid, a bow tie, and/or a lollipop type element.

Example 8 includes the subject matter of any one of Examples 1-7, comprising pneumatic actuators, hydraulic actuators, and/or a mechanical means for deploying and retracting the antenna assembly.

Example 9 includes the subject matter of any one of Examples 1-8, wherein the substrate comprises a bi-stable composite material.

Example 10 provides an underwater vehicle comprising a hull; and an antenna assembly coupled to the hull, the antenna assembly including a flexible substrate configured to be extended vertically away from the hull and retracted into the hull, a ground plane element disposed on the substrate, and a plurality of antenna elements disposed on the substrate.

Example 11 includes the subject matter of Example 10, comprising a propulsion system for moving the underwater vehicle in water.

Example 12 includes the subject matter of any one of Examples 10 and 11, wherein the ground plane and the antenna elements comprise one or more layers of a metallization material.

Example 13 includes the subject matter of any one of Examples 10-12, wherein the antenna elements are arranged along a horizontal axis on one side of the substrate.

Example 14 includes the subject matter of any one of Examples 10-13, wherein the antenna elements are arranged along a vertical axis on one side of the substate.

Example 15 includes the subject matter of any one of Examples 10-14, comprising an aperture at least partially surrounded by at least one of the antenna elements.

Example 16 includes the subject matter of any one of Examples 10-15, wherein the antenna elements comprise trapezoid, a bow tie, and/or a lollipop type element.

Example 17 includes the subject matter of any one of Examples 10-16, comprising pneumatic actuators, hydraulic actuators, and/or a mechanical means for deploying and retracting the antenna assembly.

Example 18 provides an antenna assembly comprising a flexible substrate configured to be extended from a retracted configuration to a deployed configuration and retracted from the deployed configuration to the retracted configuration; and a plurality of antenna elements disposed on the substrate, wherein, in the deployed configuration, the substrate is planar, and wherein, in the retracted configuration, the substrate is arcuate.

Example 19 includes the subject matter of Example 18, wherein the substrate is attached to an underwater vehicle.

Example 20 includes the subject matter of Example 19, wherein in the deployed configuration, the antenna assembly extends vertically away from a hull of the underwater vehicle, and in the retracted configuration, the antenna assembly is retracted into the hull and/or conforms to a shape of the hull.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna assembly comprising:

a flexible substrate comprising a bi-stable composite material configured to be extended from a retracted configuration to a deployed configuration, and retracted from the deployed configuration to the retracted configuration, wherein the bi-stable composite material includes a fiber-reinforced polymer matrix with pre-stressed fibers embedded therein and configured to transition between states, and wherein the substrate is further configured to resist deformation under hydrostatic pressure when deployed;

a ground plane element disposed on the substrate; and a plurality of antenna elements disposed on the flexible substrate;

wherein, in the deployed configuration, the antenna assembly extends vertically away from a hull of an underwater vehicle such that the antenna assembly is substantially planar, wherein when one end of the bi-stable composite material is pulled away from the remainder of the bi-stable composite material, the bi-stable composite material forms a rigid, elongated, and planar shape; and wherein, in the retracted configuration, the substrate rolls onto itself and is wound around a spool within the hull such that the antenna assembly is retracted into the hull and/or conforms to a shape of the hull.

2. The antenna assembly of claim 1, wherein the substrate is attached to the underwater vehicle.

3. The antenna assembly of claim 1, wherein the ground plane and the antenna elements comprise one or more layers of a metallization material.

4. The antenna assembly of claim 1, wherein the antenna elements are arranged along a horizontal axis on one side of the substrate.

5. The antenna assembly of claim 1, wherein the antenna elements are arranged along a vertical axis on one side of the substate.

6. The antenna assembly of claim 1, comprising an aperture at least partially surrounded by at least one of the antenna elements.

7. The antenna assembly of claim 1, wherein the antenna elements comprise trapezoid, a bow tie, and/or a lollipop type element.

8. The antenna assembly of claim 1, comprising pneumatic actuators, hydraulic actuators, and/or a mechanical means for deploying and retracting the antenna assembly.

9. An underwater vehicle comprising:

a hull; and an antenna assembly coupled to the hull, the antenna assembly including a flexible substrate comprising a bi-stable composite material configured to be extended vertically away from the hull when deployed such that the antenna assembly is substantially planar, and wherein the antenna assembly is extended from within the hull, and wherein, once one end of the substrate is pulled away from the remainder of the substrate, the bi-stable composite material exhibits a second state where it forms a rigid, elongated, and planar shape, and wherein at least a portion of the antenna assembly extends above the water surface while at least a portion of an underwater vehicle remains submerged below a water surface, and wherein the substrate rolls onto itself and is wound around a spool within the hull when the antenna assembly is retracted into the hull, a ground plane element disposed on the substrate, and a plurality of antenna elements disposed on the substrate.

10. The underwater vehicle of claim 9, comprising a propulsion system for moving the underwater vehicle in water.

11. The underwater vehicle of claim 9, wherein the ground plane and the antenna elements comprise one or more layers of a metallization material.

12. The underwater vehicle of claim 9, wherein the antenna elements are arranged along a horizontal axis on one side of the substrate.

13. The underwater vehicle of claim 9, wherein the antenna elements are arranged along a vertical axis on one side of the substate.

14. The underwater vehicle of claim 9, comprising an aperture at least partially surrounded by at least one of the antenna elements.

15. The underwater vehicle of claim 9, wherein the antenna elements comprise trapezoid, a bow tie, and/or a lollipop type element.

16. The underwater vehicle of claim 9, comprising pneumatic actuators, hydraulic actuators, and/or a mechanical means for deploying and retracting the antenna assembly.

* * * * *